United States Patent Office 3,551,518
Patented Dec. 29, 1970

3,551,518
GRAFTED COPOLYMERS
René Pornin, Arthez-de-Bearn, France, assignor to Societe
Nationale des Petroles d'Aquitane, Courbevoie, France
No Drawing. Filed Apr. 3, 1968, Ser. No. 718,381
Claims priority, application France, Apr. 6, 1967,
102,189
Int. Cl. C08g 45/04
U.S. Cl. 260—836       8 Claims

ABSTRACT OF THE DISCLOSURE

Method of preparing a thermoplastic graft copolymer, which consists in: mixing a polymeric material deriving from a monomer having 2 to 8 carbon atoms, epoxidized to a degree of 0.1 to 25 mole percent of epoxy groups, with an unsaturated polymerizable non-acid compound having 2 to 10 carbon atoms, and a catalytic amount of a monovalent ionic compound; heating the mixture at 50° to 150° C. until graft copolymer is formed; and separating the graft copolymer from the reaction mixture thus obtained.

---

The invention relates to a new process for the grafting of unsaturated organic compounds on to various polymers. The invention is particularly, but not exclusively, applicable to a process for obtaining grafted copolymers by the action of vinyl, acryl or other compounds on polydiolefines and/or their copolymers. The invention also relates to the new copolymers obtained by the processes provided thereby.

Grafting is a well-known technique which enables the properties of various plastics materials and elastomeric materials to be modified. For example, it is commonly used in connection with rubber-like polybutadiene compounds on to which compounds such as styrene and/or acrylonitrile are grafted. However, in the conventional processes, which use radical catalysts or radiation, it is impossible exactly to control the proportion and the distribution of the radicals grafted on to the polymer which is treated. On the other hand, it has been proposed to carry out reactions between epoxidized polymers of dienes and polycarboxylic acids or anhydrides, which are usually unsaturated and include in particular maleic anhydride, possibly in the presence of styrene; however, this generally results in the production of hard resins which have poor flexibility and are frequently brittle; such is the case with, for example, the processes described in French patent specification No. 1,315,735 and in British patent specification No. 922,356.

The present invention provides an improvement in this technique, by making it possible to predetermine the number of active sites in a polymer, which will be capable of leading to the establishment of grafted chains. It permits of regulating the grafting density in advance, that is to say the number of points on the main chain at which grafted chains will be established; in this way, it is possible to obtain from thermoplastic copolymers or polymers, materials which are modified to a greater or lesser degree, but which preserve the required flexibility. On the other hand, the invention makes possible an efficient grafting operation without the use of saturated or unsaturated polyacids or anhydrides and without the use of radical catalysts; it achieves the desired object by means of catalysts which do not leave any undesirable residue in the end-product.

The process according to the invention consists in causing one or more polymerisable, non-acid, unsaturated organic compounds to react, in the presence of a monovalent ionic catalyst, with a polymer of which the chains contain epoxy groups.

The polymers having epoxide groups which can be used may originate from any polymer capable of being epoxidised, particularly from those which carry residual double bonds. Thus, it is possible to employ various polydiolefines and their copolymers. Among the very common polymers which can be epoxidised, mention may be made of polybutadiene, polyisoprene and butyl rubber, for example, and also the copolymers thereof with, for example, ethylene, propylene and/or isobutene, such as, in particular, the terpolymers of the ethylene-propylene-T type, where T is a diolefine.

A large range of unsaturated compounds can be used for grafting on to the aforementioned epoxidised polymers. They include primarily mono-olefine or diolefine hydrocarbons, particularly the common compounds containing 2 to 12 carbon atoms such as, for example, ethylene, propylene, 1-butene, 2-butene, isobutene, 1-amylene, 2-amylene, isoamylene, butadiene, penta-1,3-diene, penta-1,4-diene and 2-methyl-buta-1,3-diene (isoprene). It is also possible to use vinyl and/or acryl halides and esters, such as vinyl acetate, vinyl chloride, acrylonitrile, allyl chloride and methyl methacrylate for example. Various other unsaturated compounds, such as aryl vinyls, for example styrene, tolyl vinyl, divinyl benzene, indene and vinyl pyridine are also suitable. Moreover, mixtures of two or more unsaturated compounds of different natures can be used concurrently in the preparation of grafted copolymers according to the invention.

The obtaining of chains which are epoxidised to a greater or lesser degree has been achieved previously and does not form part of the present invention; thus, for example, it can be achieved by treating a polymer by means of an organic peroxide, in the presence of certain catalysts particularly molybdenum compounds; one of the possible epoxidation procedures is described in French patent specification No. 1,439,068.

What is important when carrying out the present invention is to choose a suitable degree of epoxidation of the polymer to be grafted, as a function of the qualities which are desired in the copolymer which is to be prepared. Furthermore, depending on circumstances, it may be necessary to start with a very slightly epoxidised chain or, on the other hand, a fairly intensively epoxidised chain. Thus the degree of epoxidation can vary within wide limits, for example, from less than 0.1% to more than 25%; usually, when it is a main chain originating from a diolefine which is involved, the degree of epoxidation, is of the order of 1 to 15%.

The degree of epoxidation is expressed as the percentage of double bonds of the polymer which are transformed into epoxy groups.

The grafting reaction between the epoxidised polymer and the unsaturated compound is usually effected at temperatures which are between ambient temperature and 150° C., generally between 50° and 150° C. and especially within the range from 60° to 120° C.

An important feature of the invention is the catalysis of the grafting reaction by means of monovalent ionic compounds such as, in particular, monocarboxylic acids, and the salts thereof with alkali metals, alkali hydroxides, or derivatives of these latter, such as amides, and the phenates or alcoholates of alkali metals. The monocarboxylic acids such as, for example, formic, acetic, propionic and butyric acids are particularly active; they have the additional advantage of not forming any impurity which is harmful to the prepared polymer.

Another advantage of the catalysts used according to the invention lies in the small quantities in which they are effective; generally, about 0.1 to 2 and preferably 0.2 to 1.5 equivalents of ionic catalyst per epoxy group present in the polymer being treated is sufficient; the best proportion is of the order of 0.35 to 0.7 equivalents, and on average 0.5 equivalent per epoxy group.

The grafting process according to the invention can be carried into effect by simply mixing the epoxidised polymer or polymers with the unsaturated compound or compounds and the catalyst, or even by bringing these substances into contact in a solvent or a dispersing agent. In many cases, inert aromatic solvents of the toluene or xylene type are particularly suitable. In the case where the reaction takes place in an emulsion or suspension, the dispersing medium is advantageously water.

The invention will be more clearly understood from the following non-limitative examples.

EXAMPLE 1

To 10 parts by weight of polybutadiene, previously epoxidised to the extent of about 2% and containing 0.11 part of $CH_3COOH$, there are added 100 parts of styrene, and the mixture is stirred for 5 hours at 60° C. until the epoxidised polybutadiene dissolves in the monomeric styrene.

By taking a sample, it is found that grafted polybutadiene-polystyrene copolymers have been formed, there being also a small content of styrene.

The solution is heated to 100° C. for 3 hours, and after this time, the composition is found to have set completely. After cooling the composition, the monomeric styrene and the homopolystyrene are eliminated therefrom, the latter being present in small quantity; this elimination is effected by selective extraction with a mixture of 15 parts of cyclohexane and 85 parts of acetone.

A grafted copolymer, containing 70% of polystyrene, is then left; it is soluble in aromatic solvents and the solutions in benzene leave a film of bluish-green colour after slow evaporation.

EXAMPLE 2

One part by weight of polybutadiene epoxidised to the extent of 2% and containing 0.0137 part of propionic acid, i.e. 0.5 mole of acid per epoxy group present, is dissolved in 19 parts of toluene. Eight parts of styrene are added and heating takes place for 6 hours at 110° C.

After the elimination of homopolystyrene (0.8 part), styrene (4.2 parts) and toluene, there remain 4 parts of a grafted copolymer.

EXAMPLE 3

In operations similar to that of Example 1, polybutadiene epoxidised respectively to 4% and 8%, and containing 2.2% of acetic acid, is used.

After the first heating phase with stirring for 5 hours at 60° C., it is found that the quantities of styrene fixed in the grafted copolymer are respectively approximately twice and approximately four times as large as in Example 1. It can be concluded therefrom that the percentage of the styrene fixed in a given time increases with the number of epoxidised sites present.

At the same time, it is found that the fraction of homopolystyrene, which was already relatively low, decreases when the content of epoxides increases.

EXAMPLE 4

The operation of Example 2 is repeated using polybutadiene epoxidised to the extent of 15%.

Under these conditions, 7 parts of polymer are isolated.

EXAMPLE 5

10 g. of polybutadiene, epoxidised to the extent of 4%, are dissolved in 100 g. of styrene; the solution which is obtained has added thereto 1 g. of sodium phenolate, and the solution is heated to 110° C. First of all, a blue colouring appears, but this disappears after heating for about 1½ hours. During this heating the solution slowly sets; after 7 hours, the monostyrene and homopolystyrene are eliminated and the remaining product contains 90% of polystyrene grafted on the polybutadiene.

EXAMPLE 6

One part by weight of ethylene-propylene-methylene-norbornene terpolymer, available commercially under the name "ESSO 3509," of which the degree of unsaturation is about 3%, is epoxidised and is dissolved in 10 parts of monomeric styrene containing 0.012 part of formic acid.

The solution is heated to 100° C. for 5 hours and then becomes very viscous. There is isolated therefrom 3.4 parts of a copolymer containing 70% of styrene.

In a comparison test (not exemplifying the invention) all the operating conditions are the same, except that the terpolymer which is used is not epoxidised; on completing the operation the terpolymer is found to be unchanged, and homopolystyrene is found to be present in addition thereto.

EXAMPLE 7

The epoxidised terpolymer of Example 6 is dissolved as a 5% solution in toluene, with 1.4% of acetic acid, relatively to the weight of polymer.

The solution is divided into 4 fractions, to which are added different proportions of divinylbenzene, as follows:

| | Percent |
|---|---|
| 1 | 0.01 |
| 2 | 0.2 |
| 3 | 0.93 |
| 4 | 1.2 |

Each of the fractions, with the above-mentioned proportion of divinylbenzene added thereto, is heated to 110° C. for 9 hours. Then the terpolymer present is precipitated from the toluene solution by adding methanol, and the remaining polymer is examined. It is established that, in all cases, this latter is constituted by a grafted copolymer which is different from the original terpolymer; however, in the fourth fraction, an insoluble precipitate is formed during the reaction.

EXAMPLE 8

Starting from four portions of a sample of "butyl rubber," that means a copolymer of 98% isobutylene with 2% isoprene, having a 3% unsaturation degree, the 4 following operations were carried out. 100 g. of the butyl rubber, epoxidized in two cases and not epoxidized in the two others, added or not with acetic acid, are heated with 2000 ml. of styrene at 110° C. for 4½ hours. Remaining styrene was then separated, the polymer formed was weighed and analysed.

The following results were obtained.

| Butyl rubber used | Additive | Weight of product, g. | Observation |
|---|---|---|---|
| (a) Epoxide ratio 3% | 10 ml., $CH_3COOH$ | 867 | Grafting. |
| (b) Epoxide ratio 3% | No | 734 | No grafting. |
| (c) No epoxide | 10 ml., $CH_3COOH$ | 650 | Do. |
| (d) No epoxide | No | 665 | Do. |

The product obtained in run (a) contains 133 g. of a graft copolymer, in which 1 weight part of styrene was grafted on 3 parts of rubber, the remaining material being homopolystyrene (734 g.). The graft copolymer was thermoplastic and flexible, though it was somewhat more rigid than the starting butyl rubber.

In the products obtained in runs (b), (c) and (d) all the starting butyl rubber was found unchanged, while it was accompanied by polystyrene, without any grafting.

Thus, it is seen neither epoxidizing alone (b), nor adding acid (c) suffice to cause grafting: both epoxide groups in the polymer treated, and the presence of carboxylic acid in the reaction medium, are necessary to have styrene grafted on the polymer.

EXAMPLE 9

Operations similar to those of Example 8 were carried out with polybutadiene having 0 to 20% mole epoxy groups; the amount of styrene used was 4000 ml. for 100 g. of polybutadiene. Heating at 110° C. lasted 7 hours.

| Percent epoxy groups in polybutadiene | Acetic acid added, g. | Weight of product obtained, g. | Styrene grafted on 100 polybutadiene |
| --- | --- | --- | --- |
| (e) 0 | 0 | 1,000 | 20 |
| (f) 10 | 5.5 | 1,520 | 300 |
| (g) 17 | 16.6 | 2,040 | 500 |
| (h) 20 | 22 | 2,160 | About 2,000 |

The amount of styrene grafted on polybutadiene chains increases with the degree of epoxidization; when that degree reaches 20% (h) the grafting becomes very important and the product formed is completely soluble in 85:15 acetone-cyclohexane mixture.

EXAMPLE 10

A solution of 100 g. of polybutadiene having 15% molar epoxy groups, in 4000 ml. of styrene, added with 36 g. of azobisisobutyronitrile, was heated at 70° C. for 7 hours. 3700 g. of polymer were obtained which, on fractionating, revealed to be composed of the starting polybutadiene and of homopolystyrene, while no grafted polybutadiene was found therein. Thus, it is seen the free radicals giving catalyst (azobisisobutyronitrile) does not cause grafting as the carboxylic acids of preceding examples do.

In contradistinction to grafted products obtained according to prior art by reacting difunctional compounds on epoxydized polyenes, the copolymers prepared according to the invention are not cross-linked and they are still soluble in usual organic solvents. The graft copolymers of the invention are thermoplastic; when they are prepared starting from polybutadiene and styrene, they are soluble in benzene or in chloroform.

As long as the content in styrene grafts in the product does not exceed 30% of the elastomer treated, the product according to the invention still exhibits—to a certain extent—a rubbery nature like the starting elastomer. When the amount of styrene grafted exceeds 50%, the product is rigid and shows properties similar to those of chock polystyrene. The molecular weight of styrene grafts, relatively polydispersed, are generally of about 10,000 to about 200,000 depending upon the particular operating conditions in which preparation took place.

What is claimed is:

1. Method of preparing a thermoplastic graft copolymer, which consists essentially of: (a) forming a mixture of (1) a polymeric material derived from at least one olefinic hydrocarbon of from 2 to 8 carbon atoms, from 0.1 to 25 mole percent of the double bonds of the polymeric material being transformed into epoxy groups, (2) an unsaturated polymerizable non-acid compound of from 2 to 10 compounds, and (3) a catalytic amount of a monovalent ionic compound selected from the group consisting of alkali metal hydroxides, alkali metal phenates, alkali metal alcoholates, alkali metal carboxylates, and monocarboxylic acids; (b) heating the mixture at 50° to 150° C. for a period of time sufficient to form a graft copolymer; and separating the graft copolymer from the reaction mixture thus obtained.

2. Method according to claim 1, wherein said monovalent ionic compound is selected from the group consisting of sodium hydroxide, potassium hydroxide, sodium phenate and potassium phenate.

3. Method according to claim 1, wherein said monovalent ionic compound is a monocarboxylic acid having 1 to 6 carbon atoms.

4. Method according to claim 3, wherein the catalytic amount is of 0.1 to 2 equivalents of the acid per epoxy group present in the polymeric epoxidized material.

5. Method according to claim 4, wherein the amount of monocarboxylic acid is 0.35 to 0.7 equivalent per epoxy group present in the polymeric material.

6. Method according to claim 4, wherein said polymeric material is selected from the group consisting of polybutadiene, polyisoprene, polyisobutylene, butyl-rubber, terpolymer ethylene-propylene-methylene norbornene, terpolymer ethylene-propylene-butadiene and terpolymer ethylene-propylene-isobutylene.

7. Method according to claim 5, wherein said polymeric material is selected from the group consisting of polybutadiene, polyisoprene, polyisobutylene, butyl-rubber, terpolymer ethylene-propylene-methylene norbornene, terpolymer ethylene-propylene-butadiene and terpolymer ethylene-propylene-isobutylene, while said unsaturated compound is styrene.

8. The product produced by the process of claim 1.

References Cited

UNITED STATES PATENTS

| 3,092,608 | 6/1963 | Reich | 260—836 |
| 3,133,092 | 5/1964 | Nowlin | 260—836 |
| 3,217,066 | 11/1965 | Greenspan | 260—836 |
| 3,247,284 | 4/1966 | Heiberger | 260—836 |
| 3,293,322 | 12/1966 | Pennino | 260—837 |
| 3,296,186 | 1/1967 | Gunkel | 260—836 |
| 3,455,965 | 7/1969 | Schleimer | 260—836 |

FOREIGN PATENTS

| 704,314 | 2/1965 | Canada | 260—836 |

OTHER REFERENCES

Lee et al.: Handbook of Epoxy Resins, pp. 4–63, publication date, Mar. 21, 1967, McGraw-Hill Book Co., New York, 1967.

PAUL LIEBERMAN, Primary Examiner

U.S. Cl. X.R.

260—2, 80.78, 82.1, 88.2, 94.7